United States Patent [19]

Miller et al.

[11] 4,056,431
[45] Nov. 1, 1977

[54] RESIN-CONTAINING CELLULOSIC OVERLAYS

[75] Inventors: John F. Miller, Tacoma; Rodney R. Conner, Bellevue, both of Wash.

[73] Assignee: Pacific Resins & Chemicals, Inc., Tacoma, Wash.

[21] Appl. No.: 693,559

[22] Filed: June 7, 1976

[51] Int. Cl.$^2$ ............................................. D21D 3/00
[52] U.S. Cl. ................................... 162/165; 427/391; 428/528
[58] Field of Search ............. 162/165; 260/17.2, 29.3, 260/51 R; 427/391, 439; 428/526, 528

[56] References Cited

U.S. PATENT DOCUMENTS

| | | | |
|---|---|---|---|
| 1,988,616 | 1/1935 | Turkington | 428/526 |
| 2,389,078 | 11/1945 | Powers | 260/51 R |
| 2,414,415 | 1/1947 | Rhodes | 428/526 |
| 2,586,385 | 2/1952 | Runk | 260/51 R |
| 2,804,418 | 8/1957 | King | 162/165 |
| 2,912,395 | 11/1959 | Grahm | 260/51 R |
| 3,013,916 | 12/1961 | Boiney et al. | 427/391 |
| 3,039,894 | 6/1962 | Raphael et al. | 427/391 |
| 3,390,128 | 6/1968 | Hughes et al. | 260/51 R |
| 3,637,429 | 1/1972 | Anderson et al. | 427/391 |
| 3,851,012 | 11/1974 | Wertz et al. | 260/51 R |
| 3,856,616 | 12/1974 | Scott et al. | 162/165 |
| 3,944,703 | 3/1976 | Harding | 260/17.2 |

OTHER PUBLICATIONS

Casey, "Pulp & Paper," vol. II, (1960), p. 947.

*Primary Examiner*—S. Leon Bashore
*Assistant Examiner*—Peter Chin
*Attorney, Agent, or Firm*—Christensen, O'Connor, Garrison & Havelka

[57] ABSTRACT

Disclosed are improved resin-containing cellulosic overlays for overlaying woody substrates and processes for preparing same. The overlays are produced by admixing an aqueous slurry of cellulosic fibers and a resole resin produced by reacting bisphenol A, a para-substituted phenol selected from p-tertiarybutylphenol, p-tertiaryamylphenol and p-phenylphenol and formaldehyde, precipitating the resin by acidifying the resulting slurry, forming a sheet from the resin-containing slurry and drying the sheet. The overlays produced are white in color and are highly resistant to discoloration due to exposure to sunlight, heat and caustic.

19 Claims, No Drawings

RESIN-CONTAINING CELLULOSIC OVERLAYS

BACKGROUND OF THE INVENTION

This invention relates to resin-containing cellulosic overlays useful for masking surface imperfections of woody substrates and improving the paintability, abrasion resistance and weathering properties thereof.

Such overlays are well known in the art and are generally prepared using one of two methods. In one method a liquid resin usually comprised of low molecular weight polymers is applied to a preformed paper sheet, such as by immersing the sheet in a saturating or impregnating resin bath. The sheet is then dried prior to application to a substrate. This invention does not relate to overlays produced by this method. Rather, it relates to a method commonly referred to as the "beater-addition method." In this method, an aqueous, alkaline solution of a resole resin (typically a phenol-formaldehyde resin) is added to an aqueous slurry of cellulosic fiber. The resulting furnish is thoroughly mixed to obtain uniform resin distribution and the resin is then precipitated onto the fibers by acidification of the slurry. The slurry is then converted into a wet sheet using conventional paper-making apparatus, the wet sheet then being dried. The resulting hard-surfaced, flexible, tough and substantially opaque sheet can be applied to plywood, lumber, particle board or similar woody substrates using one of many commercially available adhesives useful for this purpose. Typically, heat and pressure are applied to the substrate-overlay laminate to assure complete bonding therebetween and to cure the resin in the overlay.

Panels and boards surfaced with overlays prepared by the beater-addition method have found a wide range of applications where smooth, uniform, substantially opaque surfaces that will resist weathering and abrasion and readily accept paint are required. Among these applications are siding, soffit and panel applications in buildings; traffic signs; planking, bulkheads and transoms on boats; and concrete forms.

One shortcoming of prior art beater-addition overlays is that they tend to yellow during hot pressing and continue to develop color with age (i.e., exposure to light and air). This has prevented such overlays from being used in applications where white color is important, such as where they are overprinted with various designs such as those simulating light colored wood.

It is an object of this invention to provide beater-addition overlays that are white in color and are color stable upon aging and upon exposure to caustic.

SUMMARY OF THE INVENTION

This invention is directed to an improvement in a process for producing cellulosic overlays useful for overlaying woody substrates. In the process to which the improvement of this invention relates, an aqueous slurry of cellulosic fibers is admixed with an alkaline, water-solubilized resole resin. The resin is precipitated onto the fibers by acidification of the slurry and a sheet is formed from the acidified slurry and the sheet is dried. In the improvement of this invention, the resin employed is produced by reacting bisphenol A, from 0 to 2 moles per mole of bisphenol A of a para-substituted phenol selected from p-tertiarybutylphenol, p-tertiaryamylphenol and p-phenylphenol and an amount of formaldehyde satisfying the equations $F \geq 0.3(4X + 2Y)$ and $F \leq 4X + 2Y$ wherein F is the number of moles of formaldehyde, X is the number of moles of bisphenol A and Y is the number of moles of para-substituted phenol. The mole ratio of para-substituted phenol to bisphenol A is preferably from 0.35:1 to 1.35:1, and more preferably 0.6:1 to 1.1:1. The amount of formaldehyde employed preferably satisfies the equations $F \geq 0.5(4X + 2Y)$ and $F \leq 0.7(4X + 2Y)$.

This invention is also directed to resins employed in the described process and to overlays produced thereby.

DETAILED DESCRIPTION OF THE INVENTION

This invention is based on the discovery that resole resins useful in preparing beater-addition overlays that will exhibit a stable white color upon aging can be prepared by reacting bisphenol A and formaldehyde.

The resins used in the methods of this invention are prepared by reacting bisphenol A, from 0 to 2 moles (preferably 0.35 to 1.35 moles and more preferably 0.6 to 1.1 moles) of a para-substituted phenol selected from p-tertiarybutylphenol (most preferred), p-tertiaryamylphenol and p-phenylphenol with an amount of formaldehyde satisfying the equations $F \geq 0.3(4X + 2Y)$ and $F \geq 4X + 2Y$ wherein F is the number of moles of formaldehyde, X is the number of moles of bisphenol A and Y is the number of moles of para-substituted phenol. The resins are preferably prepared by a three-stage process, the first stage involving a base-catalyzed methylolation of the bisphenol A and para-substituted phenol, the second stage involving the acid-catalyzed conversion of the methylolated products into a novolac resin, and the third stage involving the base-catalyzed methylolation of the novolac resin using additional formaldehyde. The reaction conditions (particularly the reaction temperature) used in the third stage should be gentle so as to minimize cross linking of the novolac backbone, favor methylolation and minimize further condensation. Preferably the third stage of the reaction is carried out at temperatures of from 40° to 80° C., and most preferably about 60° C.

The amount of formaldehyde reacted with the bisphenol A and para-substituted phenol in the first two stages is preferably from 0.5 to 0.9 moles of formaldehyde (more preferably 0.55 to 0.7 moles) per mole of total phenolics (meaning bisphenol A and para-substituted phenol). Most preferably, the molar ratio of formaldehyde to total phenolics in the first two stages is about 0.6. The amount of formaldehyde employed in the third stage will depend on the ratio of bisphenol A to para-substituted phenol because of the tetrafunctionality of bisphenol A and the difunctionality of the para-substituted phenols. The amount of formaldehyde employed in the third stage can range from 0.3 to 1 times (preferably 0.5 to 0.7 times) the quantity $(4X + 2Y - 2F_n)$ wherein X is the number of moles of bisphenol A, Y is the number of moles of the para-substituted phenol and $F_n$ is the number of moles of formaldehyde employed in stages one and two.

Sodium hydroxide is the preferred basic catalyst for use in stages one and three, but other alkali metal hydroxides, ammonium hydroxide and amines, such as triethylamine and triethanolamine, may also be used. Sulfuric acid (preferred), hydrochloric acid, p-toluenesulfonic acid and oxalic acid are exemplary of acid catalysts that can be employed in stage two.

When preparing the resins used in this invention, the reactants can be combined in any order and either the bisphenol A or para-substituted phenol can be reacted with formaldehyde before the other is added.

The resins employed in the method of this invention can be prepared by omitting either or both of the first and second stages without detracting from the whiteness and color stability of the overlays produced. However, resins so produced are lower in molecular weight than resins produced according to the preferred method and this results in overlays having lower internal bond, tensile strength and abrasion resistance.

In the manufacture of cellulosic overlays by the beater-addition method, it is desirable that the freeness of the resin-fiber slurry be as high as possible, freeness being a measure of the ease with which water drains from the slurry solids during formation of a sheet. The freeness achieved generally varies inversely to the "stick point" of the resin employed, the stick point being the temperature at which fine, precipitated particles of resin will coalesce to form relatively large globules. As indicated previously, resins prepared from bisphenol A and formaldehyde alone are useful in the methods of this invention. However, such resins have relatively high stick points and are rather hard and crystalline in the precipitated state. They therefore do not coalesce to an extent necessary to achieve good freeness. Consequently, it is preferred to use a substantial amount of the para-substituted phenol to produce softer, more amorphous resins having lower stick points. Alternately, but less preferably, the stick point of a formaldehyde-bisphenol A resin can be reduced by admixing it with a plasticizer such as dibutylphthalate or other alkylphthalates or alkylphosphates.

The preferred precipitants used in the method of this invention are sulfuric, hydrochloric, phosphoric, acetic, citric or p-toluenesulfonic acids (or mixtures thereof), sulfuric acid being most preferred. Papermaker's alum can be used with low molecular weight base-catalyzed resins of the type discussed above.

An advantage of the overlays of this invention that has not been mentioned previously is that when the overlays are hot pressed (typically in contact with a substrate) volatile phenolics are not liberated. This is in contrast to the situation when overlays containing phenol-formaldehyde resins are employed.

As shown in the following Examples, the preferred overlays produced by the process of this invention exhibit high internal bond strength, abrasion resistance, wet tensile strength and resin retention values and also exhibit excellent color stability upon exposure to aging conditions and caustic.

EXAMPLE 1

320.9 grams of water was heated to 100° C. in a resin reactor. There was then added 17.8g. of 50% sodium hydroxide and 463.0g. p-tert-butylphenol. The mixture was held at 100° C. for 10 minutes to achieve complete solution whereupon 821.2g. bisphenol A was added. The mixture was again held at 100° C. for 10 minutes to achieve complete solution. Then there was added 246.6g. of 50% formaldehyde over a 10-minute period at 100° C. After all the formaldehyde was added, the reaction mixture was refluxed for an additional 20 minutes. The reaction mixture was then cooled to 70° C. and 42.5g. of 50% sulfuric acid was added over a 5-minute period. The reaction mixture was then heated to and held at 100° C. for 10 minutes. The reaction mixture was cooled to 80° C. and 241.7g. of 50% sodium hydroxide and 873.9g. water were added. At 60° C., 430.6g. of 50% formaldehyde was added over a 30-minute period. Then 141.7g. of methanol was added and the reaction mixture was maintained at 60° C. for 4¼ hours. The resulting resin was cooled to 25° C.

EXAMPLE 2

Handsheets were prepared using MGO sulfite pulp having a Canadian Standard freeness of about 500 at 21° C. and a consistency of about 1.0. To separate samples of the pulp slurry were added sufficient quantities of the resin of Example 1 and a control resin (prepared substantially as described in Example 10 of U.S. Pat. No. 3,856,616) to produce a resin loading of 45% resin solids based on the dry fiber weight in the pulp slurry. Sufficient 10% sulfuric acid was then added to each sample to reduce its pH to 4.5.

Handsheets were prepared in a square sheet mold using 36° C. water, the pH of which had been adjusted to 4.5 with 10% sulfuric acid. The white water was collected for determination of resin retention. (The determinations of resin retention are reported in Table 1.) After couching, cold pressing and drying, the sheets were stored at 73° F. and 50%RH for 24 hours. The sheets were then pressed 7 minutes at 300° F. and 200 psi between a dried ⅜-inch plywood sheet and a polished caul.

The hot pressed sheets were tested for color stability as follows. Out of the press the control sheets had a light yellow color while sheets prepared using the resin of Example 1 (hereinafter referred to as the Example 1 sheets) were white. After exposure to 125° C. air for 1 hour and 20 minutes, the control sheets developed a strong yellow-brown color whereas the Example 1 sheets showed no change. Sheets were partially masked with black paper and exposed to daylight through a southern window. After 3 days the control sheets were yellowed in the exposed area and after 15 days the exposed area had changed to brown. The Example 1 sheets showed no color change. Strips of the handsheets were immersed in 1N caustic. In 24 hours the control sheets were dark red in color. The Example 1 sheets showed no discoloration after 7 days immersion. Handsheets were also subjected to testing for internal bond strength, wet tensile strength and loss on abrasion (Taber). Results of these tests are reported in Table 1.

TABLE 1

| Sheet | Resin Retention | Internal Bond (psi) | Loss on Abrasion | Wet Tensile Strength (psi) |
|---|---|---|---|---|
| Control | 74% | 832 | 0.0011 in. | 84.8 |
| Example 1 | 66% | 870 | 0.0008 in. | 79.9 |

EXAMPLE 3

The presently preferred method of preparing large quantities of a resin to be used in the methods of this invention is as follows:

| Ingredients | Weight % |
|---|---|
| 1st Water | 9.45 |
| 1st Sodium Hydroxide (50%) | 0.49 |
| p-tert-butylphenol | 12.86 |
| Bisphenol A | 22.81 |
| 1st Formaldehyde (50%) | 6.85 |
| Sulfuric Acid (92%) | 0.64 |
| 2nd Sodium Hydroxide (50%) | 6.71 |
| 2nd Water | 24.29 |
| 2nd Formaldehyde (50%) | 11.96 |
| Methanol | 3.94 |
| | 100.00 |

The mole ratios of bisphenol A:p-tert-butylphenol:1st formaldehyde: 2nd formaldehyde are 1.00:0.86:1.14:2.00. The 1st water is charged into a resin reactor and heated to 100° C. The 1st sodium hydroxide is charged while the water is heating. When reflux has been attained, the p-tert-butylphenol is charged and the mixture is reheated to reflux. Then the bisphenol A is charged and the mixture is reheated to and maintained at reflux until complete solution is achieved. While maintaining reflux, the 1st formaldehyde is charged over a 10-minute period and the reflux is maintained for 20 minutes after the addition of formaldehyde is complete. The batch is then cooled to and maintained at 70° C. while the sulfuric acid is charged. Upon completion of the sulfuric acid addition, the batch is heated as rapidly as possible to reflux and maintained there for exactly 10 minutes. Cooling of the batch to 60° C. is then begun. When the temperature reaches 80° C., the 2nd sodium hydroxide is charged at a rate that does not cause the temperature to exceed 80° C. After the sodium hydroxide addition is complete, charging of the 2nd water is begun, and cooling is continued until a temperature of 60° C. is attained. A temperature of 60° C. is maintained until charging of the water is complete. While maintaining a temperature of 60° C., the 2nd formaldehyde is charged over a 30-minute period, or at a rate such that the temperature does not exceed 60° C. The methanol is then charged at a rate to maintain 60° C. Five minutes after the addition of methanol is complete, viscosity checks (Gardner-Holt) are begun. Upon obtaining a viscosity of "U," full cooling is applied until the temperature reaches 40° C. The resin is stored at 15–18° C.

What is claimed is:

1. In a process for producing a resin-containing cellulosic overlay useful for overlaying woody substrates comprising admixing an aqueous slurry of cellulosic fibers and an alkaline, water-solubilized resin, precipitating the resin onto said fibers by acidification of said slurry and forming a dry sheet from the acidified slurry, the improvement wherein said resin is a resole resin produced by reacting bisphenol A, from 0.35 to 1.35 moles per mole of bisphenol A of a para-substituted phenol selected from p-tertiarybutylphenol, p-tertiaryamylphenol and p-phenylphenol and an amount of formaldehyde satisfying the equations $F \geq 0.3(4X + 2Y)$ and $F \leq 4X + 2Y$ wherein F is the number of moles of formaldehyde, X is the number of moles of bisphenol A and Y is the number of moles of para-substituted phenol.

2. The process of claim 1 wherein the para-substituted phenol is p-tertiarybutylphenol.

3. The process of claim 1 wherein the mole ratio of para-substituted phenol to bisphenol A is from 0.6:1 to 1.1:1.

4. The process of claim 3 wherein the para-substituted phenol is p-tertiarybutylphenol.

5. The process of claim 1 wherein the amount of formaldehyde satisfies the equations $F \geq 0.5(4X + 2Y)$ and $F \leq 0.7(4X + 2Y)$.

6. The process of claim 5 wherein the para-substituted phenol is p-tertiarybutylphenol.

7. The process of claim 5 wherein the mole ratio of para-substituted phenol to bisphenol A is from 0.6:1 to 1.1:1.

8. The process of claim 7 wherein the para-substituted phenol is p-tertiarybutylphenol.

9. The process of claim 1 wherein said resole resin is prepared by methylolation of the bisphenol A and para-substituted phenol under basic conditions, reacting the resulting methylolated products under acidic conditions to form a novolac resin and methylolation of said novolac resin under basic conditions.

10. The process of claim 9 wherein the amount of formaldehyde consumed during said first methylolation and reaction of the methylolated products to form said novolac resin is from 0.5 to 0.9 moles per mole of bisphenol A and para-substituted phenol and the amount of formaldehyde consumed during methylolation of said novolac resin is from 0.3 to 1 times $(4X + 2Y - 2F_n)$ wherein X is the number of moles of bisphenol A, Y is the number of moles of para-substituted phenol and $F_n$ is the number of moles of formaldehyde consumed during said first methylolation and reaction of said methylolated products to form said novolac resin.

11. The process of claim 9 wherein the amount of formaldehyde consumed during said first methylolation and reaction of the methylolated products to form said novolac resin is from 0.55 to 0.7 moles per mole of bisphenol A and para-substituted phenol and the amount of formaldehyde consumed during methylolation of said novolac resin is from 0.5 to 0.7 times $(4X + 2Y - 2F_n)$ wherein X is the number of moles of bisphenol A, Y is the number of moles of para-substituted phenol and $F_n$ is the number of moles of formaldehyde consumed during said first methylolation and reaction of said methylolated products to form said novolac resin.

12. An overlay produced by the process of claim 1.
13. An overlay produced by the process of claim 2.
14. An overlay produced by the process of claim 3.
15. An overlay produced by the process of claim 4.
16. An overlay produced by the process of claim 5.
17. An overlay produced by the process of claim 9.
18. An overlay produced by the process of claim 10.
19. An overlay produced by the process of claim 11.

* * * * *